(12) United States Patent  
Natori et al.

(10) Patent No.: US 7,689,460 B2  
(45) Date of Patent: Mar. 30, 2010

(54) STORE MANAGEMENT SYSTEM AND STORE MANAGEMENT METHOD

(75) Inventors: Eiji Natori, Suwa (JP); Yasuhiro Nomura, Suwa (JP)

(73) Assignee: Seiko Epson Corporation (JP)

( * ) Notice: Subject to any disclaimer, the term of this patent is extended or adjusted under 35 U.S.C. 154(b) by 976 days.

(21) Appl. No.: 11/081,052

(22) Filed: Mar. 15, 2005

(65) Prior Publication Data

US 2005/0205670 A1 Sep. 22, 2005

(30) Foreign Application Priority Data

Mar. 18, 2004 (JP) ............................. 2004-077938

(51) Int. Cl.
*G06G 1/14* (2006.01)
*G06F 3/038* (2006.01)

(52) U.S. Cl. ........................................ 705/22; 345/204

(58) Field of Classification Search .................... 705/22
See application file for complete search history.

(56) References Cited

U.S. PATENT DOCUMENTS

2002/0109593 A1* 8/2002 Swartzel et al. ............. 340/540
2002/0167500 A1* 11/2002 Gelbman ..................... 345/204
2005/0049914 A1* 3/2005 Parish ......................... 705/14

FOREIGN PATENT DOCUMENTS

| JP | 11-133860   | 5/1999 |
| JP | 2000-200391 | 7/2000 |
| JP | 2002-065418 | 3/2002 |
| JP | 2002-083250 | 3/2002 |

* cited by examiner

*Primary Examiner*—F. Zeender
*Assistant Examiner*—Faris Almatrahi
(74) *Attorney, Agent, or Firm*—Harness, Dickey & Pierce, P.L.C.

(57) ABSTRACT

A store management system has a merchandise information management apparatus which transmits merchandise information, a merchandise tag which is provided with a first display, and receives the merchandise information which is transmitted from the merchandise information management apparatus to the merchandise tag itself and displays the merchandise information, and a display apparatus for display rack which is provided with a second display, and has a function of receiving the merchandise information which is transmitted from the merchandise information management apparatus to the display apparatus itself and displaying the merchandise information, and checking the merchandise information which is displayed on the display apparatus itself and the merchandise information which is displayed on the merchandise tag by communicating with the merchandise tag.

10 Claims, 8 Drawing Sheets

STORE MANAGEMENT SYSTEM AND STORE MANAGEMENT METHOD

BACKGROUND OF THE INVENTION

1. Field of the Invention

The present invention relates to a store management system and to a store management method which are suitable in the case of managing the display of merchandise information in a store.

Priority is claimed on Japanese Patent Application No. 2004-077938, filed Mar. 18, 2004, the content of which is incorporated herein by reference.

2. Description of Related Art

In recent years, various electronic systems for facilitating purchase and sale of merchandise in a store (a retail store or a shop) have been developed. For example, in Patent Document 1 (Japanese Unexamined Patent Application, First Publication No. 2000-200391), a system is described in which a plurality of terminals which a customer can operate are arranged in a store, and the merchandise information is displayed according to the operation of the customer.

Moreover, in Patent Document 2 (Japanese Unexamined Patent Application, First Publication No. 2002-83250), a system in which the merchandise information is displayed utilizing an information terminal which is carried by the customer is described. In this system, a non-contact type IC tag in which the merchandise information is recorded is adhered to the merchandise or the package of the merchandise, and the information thereof can be read by the portable information terminal from the non-contact type IC tag and the information thereof can be displayed.

Moreover, in Patent Document 3 (Japanese Unexamined Patent Application, First Publication No. H11-133860), a system is described in which a merchandise tag (an indicator sheet which displays the price of the merchandise, and the like) is composed of a small electronic device which includes a display apparatus in which an IC chip is provided and an antenna. In this system, by transmitting the merchandise information by a radio signal from the IC card writer, the merchandise information in a memory of the IC chip is updated, and thereby the contents of the display of the merchandise tag can be changed.

Moreover, in Patent Document 4 (Japanese Unexamined Patent Application, First Publication No. 2002-65418), a system in which a display of the merchandise information on the merchandise display rack is conducted using an RFID tag is described. The RFID tag is composed of a memory, a display apparatus, and a power supply portion, and the RFID tag can update the merchandise information that RFID tag displays by a radio signal.

In the system as described in Patent Document 3, the merchandise information of each piece of merchandise is displayed using a liquid crystal display apparatus which can be attached to the merchandise. Therefore, there is a tendency for visibility, the amount of information which can be displayed, and the like, to be decreased, as compared with a non-portable type of display.

On the other hand, in the system as described in Patent Document 4, the display apparatus of the merchandise information is provided at the merchandise display rack. Therefore, problems arise in that there is a discrepancy between the display information and the contents of the merchandise, or since the registration information using a bar code or the like which is adhered to the merchandise is not renewed, there is a discrepancy between the display information and the amount of money when accounting is performed.

SUMMARY OF THE INVENTION

The present invention was made in view of the above situation, and an object of the present invention is to provide a system in which merchandise information is clearly shown to the customer by displaying the merchandise information on both the merchandise tag and the merchandise display rack, and in detail, objects of the present invention are to provide a store management system and a store management method in which the problem due to a discrepancy in the merchandise information between two the displays can be resolved.

In order to solve the above described problems, the present invention provides a store management system having a merchandise information management apparatus which, using a memory which stores merchandise information, transmits the merchandise information stored in the memory by a radio signal, a merchandise information display tag which is attached to a piece of merchandise, is provided with a first display, and receives the merchandise information which is transmitted from the merchandise information management apparatus to the merchandise information display tag itself and displays the merchandise information on the first display, and a merchandise information display apparatus which is attached to a merchandise display rack, is provided with a second display, and has a function of receiving the merchandise information which is transmitted from the merchandise information management apparatus to the merchandise information display apparatus itself and displaying on the second display, as well as checking the merchandise information which is displayed on the merchandise information display apparatus itself and the merchandise information which is displayed on the first display of the merchandise information display tag by communicating with the merchandise information display tag which is assigned to the merchandise information display apparatus itself. According to the present invention, the merchandise information display apparatus has a function of checking the merchandise information which is displayed on the merchandise information display apparatus itself and the merchandise information which is displayed on the first display of the merchandise information display tag by communicating with the merchandise information display tag which is assigned to the merchandise information display apparatus itself. Therefore, a discrepancy in the merchandise information according to the two displays of the merchandise information display tag and the merchandise display rack can be easily prevented. Moreover, especially in the merchandise information display on the merchandise display rack among the two displays, visibility can be easily improved since a limitation according to the configuration thereof is relatively small, and thereby the merchandise information can be clearly shown to the customer.

Moreover, in the present invention, at least one of the merchandise information display tag and the merchandise information display apparatus has a function of receiving a display demand of the merchandise information from a portable information terminal, and transmitting the merchandise information which was demanded to the portable information terminal. According to the present constitution, a more detailed merchandise information can be provided to the customer using the portable information terminal.

Moreover, the merchandise information display apparatus displays the merchandise information in a state of lighting or illumination. According to the present constitution, the display is composed as the display apparatus using luminous elements such as a luminous diode and the like, or in the case of using a liquid crystal display, a back light or a front light is turned on, and thereby the merchandise information can be displayed in a state of lighting or illumination. Therefore, visibility can be improved easily.

Moreover, in the present invention, the second display of the merchandise information display apparatus has a function of displaying the image information of the merchandise which is included in the received merchandise information. According to the present constitution, correspondence between the merchandise and the merchandise information of the merchandise display rack can be checked more easily. Therefore, for example, in the case in which the merchandise is supplied, or in the case in which the merchandise which is taken at one time is returned, a correct display position of the merchandise can be informed easily.

Moreover, in the present invention, the merchandise information display tag is provided with a ferroelectric memory.

Moreover, in the present invention, the merchandise information display tag is provided with Ferroelectric Random Access Memory.

Moreover, according to the present invention, a store management system has a merchandise information management apparatus which, using a memory which stores merchandise information, transmits the merchandise information stored in the memory by a radio signal, a merchandise tag which is attached to a merchandise, and receives the merchandise information which is transmitted from the merchandise information management apparatus to the merchandise tag itself, and a merchandise information display apparatus which is attached to a merchandise display rack, and has a function of receiving the merchandise information which is transmitted from the merchandise information management apparatus to the merchandise information display apparatus itself, and checking the merchandise information which is held in the merchandise information display apparatus itself and the merchandise information which is held in the merchandise tag by communicating with the merchandise tag which is assigned to the merchandise information display apparatus itself, in which at least one of the merchandise tag and the merchandise information display apparatus is provided with the display which displays the merchandise information. According to the present constitution, the merchandise information display apparatus has a function of checking the merchandise information which is displayed on the merchandise information display apparatus itself and the merchandise information which is displayed on the merchandise tag by communicating with the merchandise tag which is assigned to the merchandise information display apparatus itself. Moreover, because the merchandise information is displayed on at least one of the merchandise tag and the merchandise information display apparatus, it is not necessary for the tag such as the price tag and the like to be attached to the merchandise, it is useful for the cost reduction of the store, and it is not necessary to conduct the attachment operation of the price tag, for which labor is required.

Moreover, a store management method according to the present invention has a step of transmitting merchandise information which is stored in a memory which stores the merchandise information by a radio signal from a merchandise information management apparatus which uses the memory, a step of, in a merchandise information display tag which is attached to a merchandise having a first display, receiving the merchandise information which is transmitted from the merchandise information management apparatus to the merchandise information display tag itself, and displaying on the first display, and a step of, in a merchandise information display apparatus which is attached to a merchandise display rack having a second display, receiving the merchandise information which is transmitted from the merchandise information management apparatus to the merchandise information display apparatus itself and displaying on the second display, and checking the merchandise information which is displayed on the merchandise information display apparatus itself and the merchandise information which is displayed on the first display of the merchandise information display tag by communicating with the merchandise information display tag which is assigned to the merchandise information display apparatus itself.

Moreover, a store management method according to the present invention has a step of transmitting merchandise information which is stored in a memory which stores the merchandise information by a radio signal from a merchandise information management apparatus which uses the memory, a step of making a merchandise information display tag which is attached to a piece of merchandise receive the merchandise information which is transmitted from the merchandise information management apparatus to the merchandise information display tag itself, a step of making a merchandise information display apparatus which is attached to a merchandise display rack receive the merchandise information which is transmitted from the merchandise information management apparatus to the merchandise information display apparatus itself, and check the merchandise information which is held in the merchandise information display apparatus itself and the merchandise information which is held in the merchandise information display tag by communicating with the merchandise information display tag which is assigned to the merchandise information display apparatus itself, and a step of displaying the merchandise information on at least one of the merchandise information display tag and the merchandise information display apparatus.

DETAILED DESCRIPTION OF THE INVENTION

Figure 1:
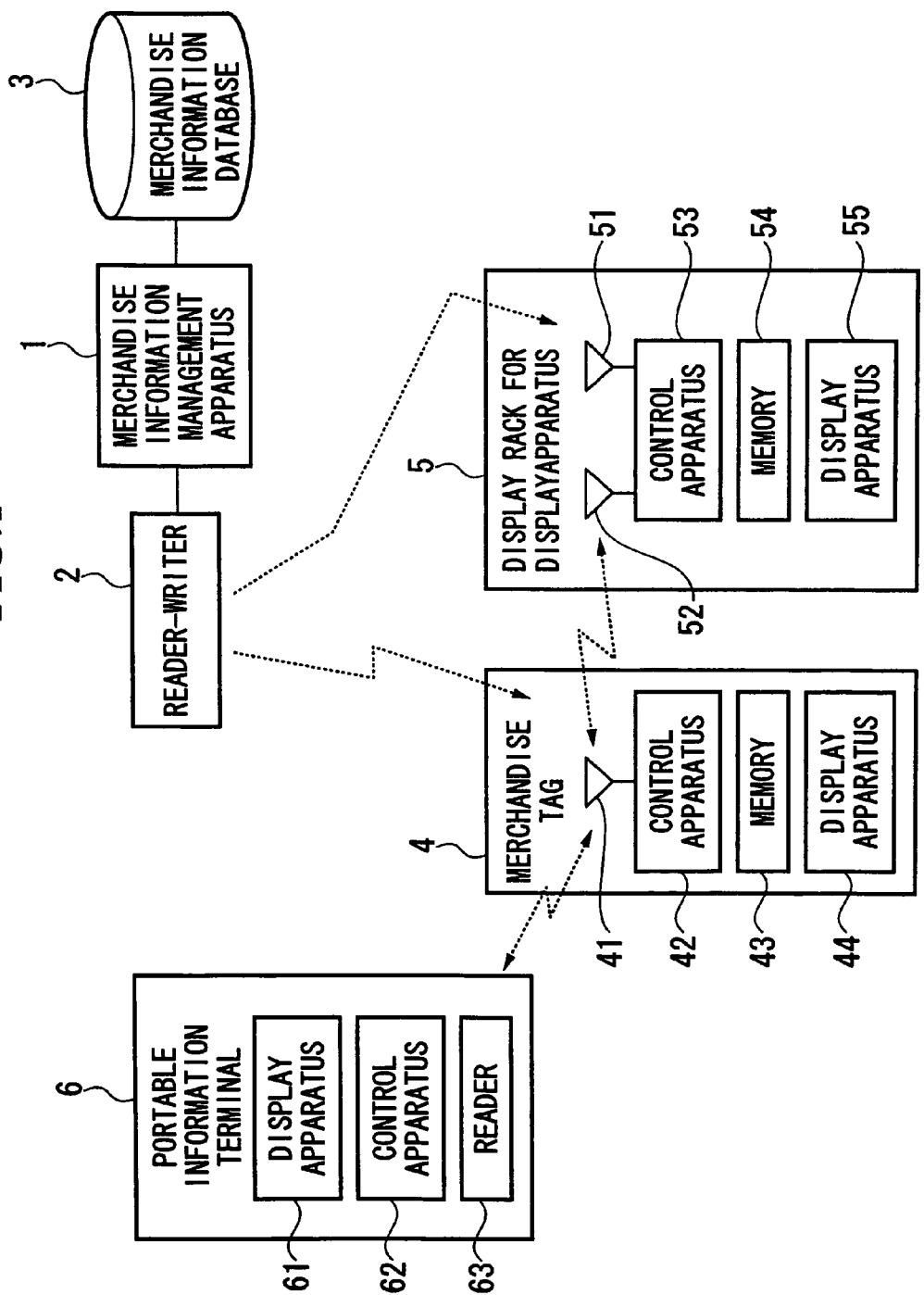
FIG. 1 is a block diagram showing a constitution of an embodiment of a store management system according to the present invention.

Hereinafter, the preferred embodiments of the store management system according to the present invention are explained with reference to the figures. FIG. 1 is a block diagram showing the constitution of the embodiment according to the present invention. The system according to FIG. 1 is composed of a merchandise information management apparatus 1, reader-writer 2, a merchandise information database 3, a merchandise tag 4 (a merchandise information display tag), a display apparatus for display rack 5 (a merchandise information display apparatus), and a portable information terminal 6. However, usually, a plurality of reader-writers 2, a plurality of merchandise tags 4, a plurality of display apparatuses 5 for display rack, and a plurality of portable information terminals 6 are installed or prepared in one store.

The merchandise information management apparatus 1 is a computer such as a personal computer and the like, and offers various functions which are utilized in the case of managing the merchandise information by carrying out a program for the present system on a prescribed operating system. The merchandise information management apparatus 1 is connected to the reader-writer 2 and the merchandise information database 3. The reader-writer 2 performs the communication with the merchandise tag 4 which has a function as an RFID tag (Radio Frequency Identification tag, or radio IC tag) or the display apparatus 5 for display rack by a radio signal. Furthermore, according to the direction from the merchandise information management apparatus 1, the reader-writer 2 writes the data in the memory 41 or the memory 51 of the merchandise tag 4 or the display apparatus 5 for display rack, and reads the data from the memory 41 or the memory 51.

The merchandise information database 3 is connected to the merchandise information management apparatus 1 via the communication line and the like, and stores and manages the information regarding a plurality of merchandise. The information (the merchandise information) which is registered corresponding to each piece of merchandise is the information such as merchandise name, merchandise number, identification information of a plurality of merchandise tags 4 which are adhered to the merchandise, the identification information of one or a plurality of display apparatus 5 for display racks which is attached to one or a plurality of rack which displays the merchandise, the merchandise specification, the maker (producer) name, a manufactured (produced) day, fixed price, the standard selling price, the present selling price (the price during a discount period), the amount of stock, the expiration date, the history of price change, the date of receipt of merchandise, and the like. The information thereof is previously registered according to the arrival time or the stock status of the merchandise.

The merchandise tag 4 is used as the tag which is attached to the merchandise. The merchandise tag 4 is composed of an antenna 41, a control apparatus 42, a memory 43, and a display apparatus (a first display apparatus) 44. The antenna 41 is used in order to transmit and receive the radio signal with the reader-writer 2, and the like. The control apparatus 42 transmits and receives the radio signal via the antenna 41, while the control apparatus 42 receives the merchandise information which is transmitted from the merchandise information management apparatus 1 to the merchandise tag 4, and writes the database thereon in the memory 43, or the control apparatus 42 reads the data which is stored in the memory 43, converts the data into the radio signal, and transmits the radio signal thereof. The memory 43 is a rewritable nonvolatile memory, and stores the peculiar identification information for each merchandise tag and the merchandise information of the merchandise to which it is adhered. The display apparatus 44 is composed of a liquid crystal display apparatus or the like, and displays the merchandise information and the like according to the control signal from the control apparatus 42.

The display apparatus 5 for display rack is a display apparatus which is attached to the merchandise display rack. The display apparatus 5 for display rack is composed of antennas 51 and 52, a control apparatus 53, a memory 54, and a display apparatus (a second apparatus) 55. The control apparatus 53 transmits and receives the radio signal via the antenna 52, while the control apparatus 53 receives the merchandise information which is transmitted from the merchandise information management apparatus 1 to the display apparatus for display rack, and writes the database thereof in the memory 54, or the control apparatus 53 reads the data which is stored in the memory 54, transforms the data to the radio signal, and transmits the radio signal. Moreover, the control apparatus 53 has a function of checking the merchandise information which is displayed on the control apparatus 53 itself and the merchandise information which is displayed on the merchandise tag, by means of transmitting and receiving the radio signal via the antenna 51, and thereby communicating with the merchandise tag 4 which is assigned to the control apparatus 53 itself. The memory 54 is a rewritable nonvolatile memory, and stores the identification information of each display apparatus for display rack or the merchandise information of the display merchandise to which it is adhered. The display apparatus 55 is composed of a liquid crystal display apparatus or the like, and displays the merchandise information and the like according to the control signal from the control apparatus 53.

The portable information terminal 6 is an information terminal which is carried by the customer, and is constituted as a PDA (Personal Digital Assistants) or a portable telephone. The portable information terminal 6 is composed of a display apparatus 61 which is composed of the liquid crystal display apparatus or the like, a control apparatus 62 which controls each portion, and a reader 63 which conducts wireless communication with the merchandise tag 4 or the display apparatus 5 for display rack, and reads the data.

Next, the appearances of a part of a constitution shown in FIG. 1 and a constitution relevant to the constitution thereof are explained with reference to FIG. 2. The reader-writer 2 is attached to the ceiling 7 and the like of the store. In the portable information terminal 6, the display surface of the display apparatus 61 is formed on the upper surface of a housing 6a, and the antenna portion of the reader 63 is formed on the upper portion of the housing 6a. Furthermore, a button 64 is provided at a lower portion of the upper surface of the housing 6a. When the button 64 is pushed, the wireless communication is established between the portable information terminal 6 and the adjacent merchandise tag 4 or the adjacent display apparatus 5 for display rack, and the merchandise information is displayed on the display apparatus 61.

Figure 2:
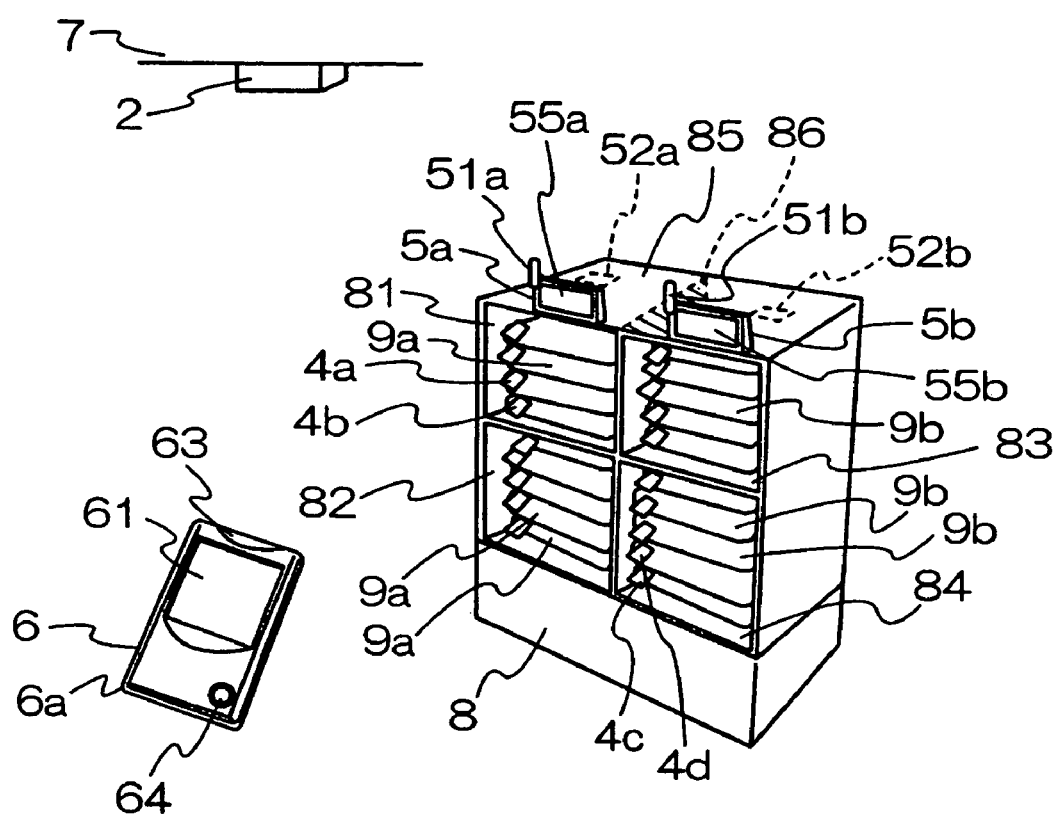
FIG. 2 is a figure showing an appearance of the component of the embodiment shown in FIG. 1.

In FIG. 2, two display apparatuses 5a and 5b for display rack corresponding to the display apparatus 5 for display rack as shown in FIG. 1 are attached to the upper portion of the display rack 8.

In this case, the display rack 8 has four spaces 81-84 in order to place the merchandise. Pieces of the same merchandise 9a and 9a are displayed in space 81 and space 82. Pieces of the same merchandise 9b and 9b are displayed in space 83 and space 84. Each of merchandise tag 4a and 4b corresponding to the merchandise tag 4 as shown in FIG. 1 is attached to each merchandise 9a and 9a. Each of the merchandise tags 4a and 4b corresponding to the merchandise tag 4 as shown in FIG. 1 is attached to each of the merchandise 9b and 9b respectively.

The display apparatus 5a for a display rack is provided with the display apparatus 55a at the position of facing the front of the display rack 8, while the display apparatus Sa for display rack is provided with the antenna 51a near the display apparatus 55a. The display apparatus 55a is a constitution corresponding to the display apparatus 55 in FIG. 1, while the antenna 51a is a constitution corresponding to the antenna 51 in FIG. 1. The antenna 52a corresponding to the antenna 52 in FIG. 1 is an antenna such as a loop antenna, a strip antenna, or the like, and is attached at the lower surface of an upper rack plate 85 so as to have a direction of directivity toward space 81 and 82. In this case, the merchandise tag 4a and 4b which are attached to the merchandise 9a and 9a which is displayed in space 81 or space 82 are assigned to the display apparatus 5a for display rack, and the merchandise information of the merchandise 9a and 9a is displayed on the display apparatus 55a.

The display apparatus 5b for display rack is provided with the display apparatus 55b at the position of facing the front of the display rack 8, while the display apparatus 5b for display rack is provided with the antenna 51b near the display apparatus 55b. The display apparatus 55b is the constitution corresponding to the display apparatus 55 in FIG. 1, while the antenna 51b is the constitution corresponding to the antenna 51 in FIG. 1. The antenna 52b corresponding to the antenna 52 in FIG. 1 is the antenna such as a loop antenna, a strip antenna, or the like, and is attached at the lower surface of an upper rack plate 85 so as to have a direction of directivity toward space 83 and 84. The merchandise tags 4c and 4d which are attached to the merchandise 9b and 9b which is displayed in space 83 or space 84 are assigned to the display apparatus 5b for display rack, and the merchandise information of the merchandise 9b and 9b is displayed on the display apparatus 55b.

In addition, the rack plate of the display rack 8 is formed with laminated wood, or plate made from nonmetal and synthetic resin material. However, the metal thin plate or the like is adhered to the standing board 86 at the boundary between space 81 and space 82, and between space 83 and space 84, or the metal thin plate or the like is embedded in the standing board 86 at the boundary between space 81 and space 82, and between space 83 and space 84. According to this constitution, the antenna 52a can fully communicate with the merchandise tags 4a and 4b which is attached to the merchandise 9a and 9a which is displayed in space 81 or 82 and is assigned to the display apparatus 5a for display rack, and the antenna 52a cannot fully communicate with the other merchandise tags 4c and 4d. On the other hand, the antenna 52b can fully communicate with the merchandise tags 4c and 4d which is attached to the merchandise 9b and 9b which is displayed in space 83 or 84 and is assigned to the display apparatus 5b for display rack, and the antenna 52b cannot fully communicate with the other merchandise tags 4a and 4b.

Next, the constitution of the merchandise tag 4 in FIG. 1 is explained with reference to FIG. 3. The merchandise tag 4 is composed of the antenna 41 such as a loop antenna or the like, an IC 401 which is formed as one IC (integrated circuit) including a control apparatus 42 and a memory 43, and a display apparatus 44. In addition, in IC 401, the constitution other than the memory 43 corresponds to the control apparatus 42. In this case, electric power transmission and information transmission are performed using the induction electromagnetic field induced by the antenna 41. Furthermore, an internal electrical power source is used in order to store the electric power transmitted by electric power transmission in a capacitor or a secondary battery. However, a primary battery, a secondary battery, photovoltaic cell, or the like which is attachable and detachable may be used as the internal electrical power source.

IC 401 is composed of a high frequency circuit 411, a power supply portion 412, a data demodulation circuit 413, a data modulation circuit 414, a data control circuit 415, a memory 43, and a secret code processing circuit 416. The high frequency circuit 411 supplies an alternating electric power which is obtained from the induction electromagnetic field received by the antenna 41 to the power supply portion 412, while the high frequency circuit 411 outputs the high frequency signal of a predetermined frequency to the data demodulation circuit 413, and amplifies the modulation signal inputted from the data modulation circuit 414 and outputs the modulation signal thereof to the antenna 41. The power supply portion 412 is composed of the power supply circuit which outputs the exchange electric power which was inputted as the direct current power supply of a predetermined voltage, a reset circuit which outputs a reset signal to each portion, and a clock circuit which supplies a clock signal to each portion. The data demodulation circuit 413 demodulates the high frequency signal which is inputted from the high frequency circuit 411, and outputs the demodulated high frequency signal as the data signal. The data modulation circuit 414 outputs the high frequency signal of a predetermined frequency which is modulated by the inputted data signal to the high frequency circuit 411.

The data control circuit 415 decodes the data signal output from the demodulation circuit 413 by the secret code processing circuit 416, and interprets the data signal thereof, and according to the command within the data signal, the data control circuit 415 performs the display control which writes the data in the memory 43, reads the data from the memory 43, or outputs the control signal to the display apparatus 44. At that time, after the data control circuit 415 encrypts the data which is read from the memory 43 in the secret code processing circuit 416, the data control circuit 415 outputs the data thereof to the data modulation circuit 414.

The memory 43 is a nonvolatile memory which is rewritable electrically, especially, for example, FeRAM (Ferroelectric Random Access Memory) which is a ferroelectric memory is used as the nonvolatile memory. FeRAM is the nonvolatile memory which utilizes the ferroelectric as a memory element. FeRAM can be integrated highly as compared with a flash memory, EEPROM, and the like. Moreover, because the operating speed of FeRAM is higher by three to five orders of magnitude, and power consumption of FeRAM is lower by five orders of magnitude, as compared with the flash memory or EEPROM, FeRAM has the characteristic of having high speed and low power consumption. Therefore, since the memory 43 is FeRAM, much information can be read and written in the state of non-contact in a short time. Especially, in view of the feature of low power consumption, FeRAM can be properly used for a non-contact type tag. In this case, because a processing according to the merchandise information can be carried out in a short time, the time for encrypting the data which is transmitted and is received can be secured easily, and thereby the overall time for communicating with a plurality of merchandise tags 4 can be shortened.

A secret code processing circuit 416 performs encryption and decryption of the data signal by an encryption system such as a well-known common key encryption system, and the like. In an example in FIG. 4, the other circuits except the high frequency circuit 411 within IC 401 can be constituted as one chip, or three circuits including the data control circuit 415, the memory 43, and the secret code processing circuit 416 can be constituted as one chip constitution.

The display apparatus 44 is a display apparatus which is composed of liquid crystal display elements and driving circuits.

The merchandise information is displayed based on the control signal which is output from the data control circuit 415. In addition, the display element in the display apparatus 44 is not limited to the liquid crystal display element, and another display element which is not volatile may be used as the display element.

Figure 4:
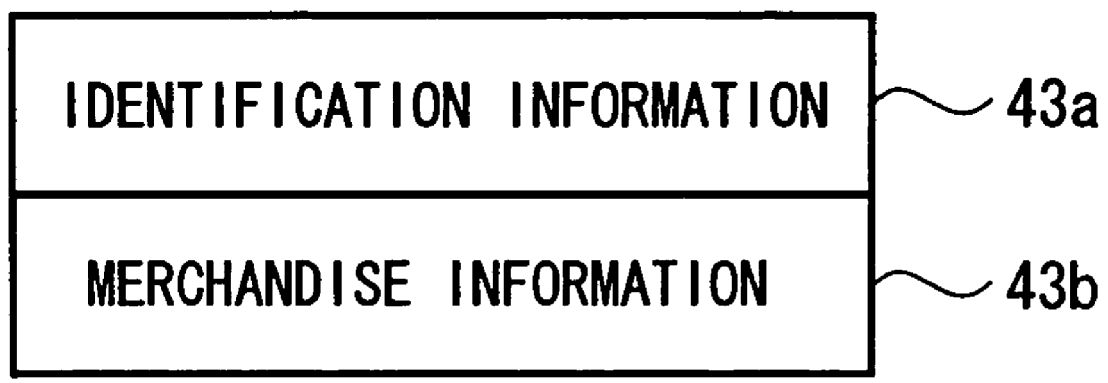
FIG. 4 is a figure showing a constitution of a memory according to FIG. 3.
Figure 5:
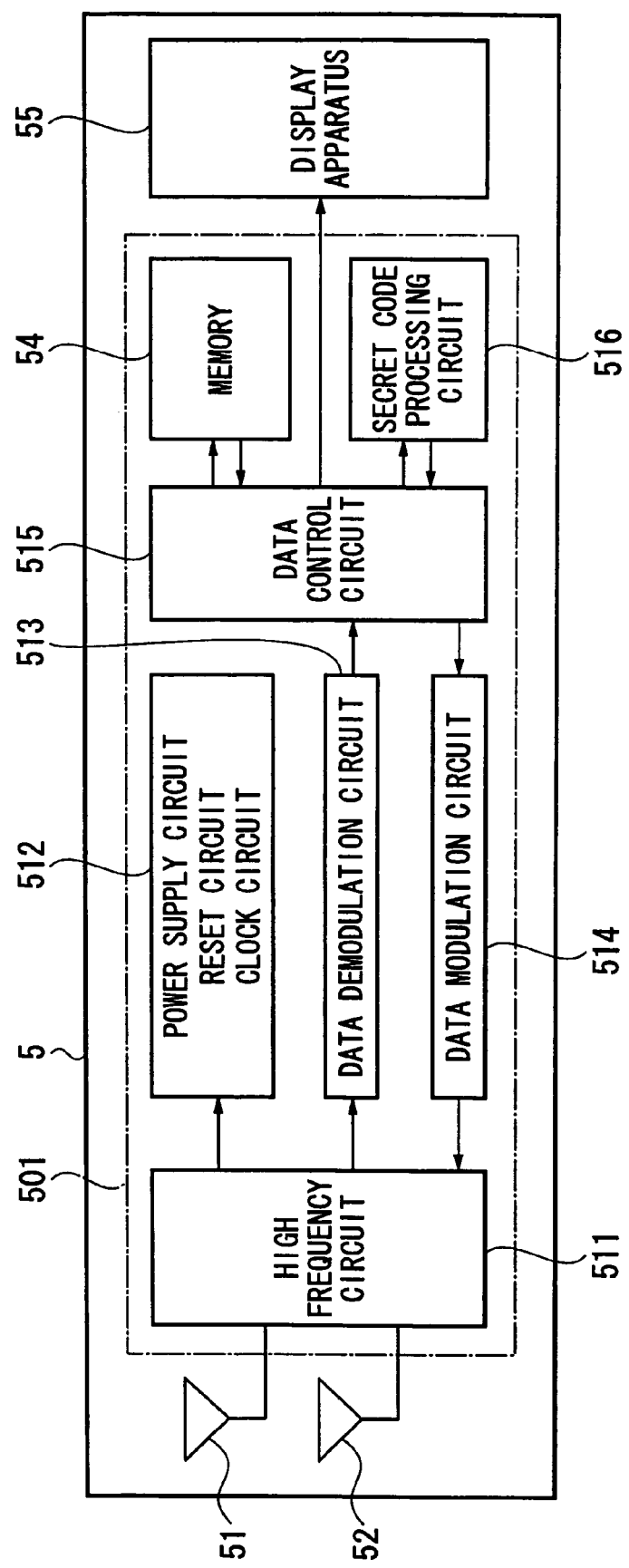
FIG. 5 is a block diagram showing a constitution of the display apparatus for display rack according to FIG. 1.

Next, the constitution of the data which is stored in the memory 43 is explained with reference to FIG. 4. The identification information 43a and the merchandise information 43b are stored in the memory 43. The identification information 43a is the peculiar information for each merchandise tag 4, and is not usually changed once the identification information 43a is written. The merchandise information 43b consists of various data which constitutes the merchandise information. When the signal which instructs the writing of the data is transmitted, the identification information which indicates the merchandise tag 4 to which the data is written is confirmed, and only when the identification information thereof conforms with the identification information 43a which is stored in the memory 43 is the writing of the data allowed. Next, the constitution of the display apparatus 5 for merchandise rack in FIG. 1 is explained with reference to FIG. 5. The display apparatus 5 for merchandise rack is composed of the antennas 51 and 52 such as loop antennas or the like, IC 501 which is formed as one IC including the control apparatus 53 and the memory 54, and the display apparatus 55. In addition, in IC 501, the constitution other than the memory 54 corresponds to the control apparatus 53. Moreover, in the display apparatus 5 for merchandise rack, a primary battery, a secondary battery, a photovoltaic cell which is attachable and detachable, a transformer for transforming a commercial power supply into a predetermined DC power supply, or the like can be used as an internal electrical power source. However, in the display apparatus 5 for merchandise rack, the electric power transmission may be utilized as well as in the case of the merchandise tag 4.

Figure 3:
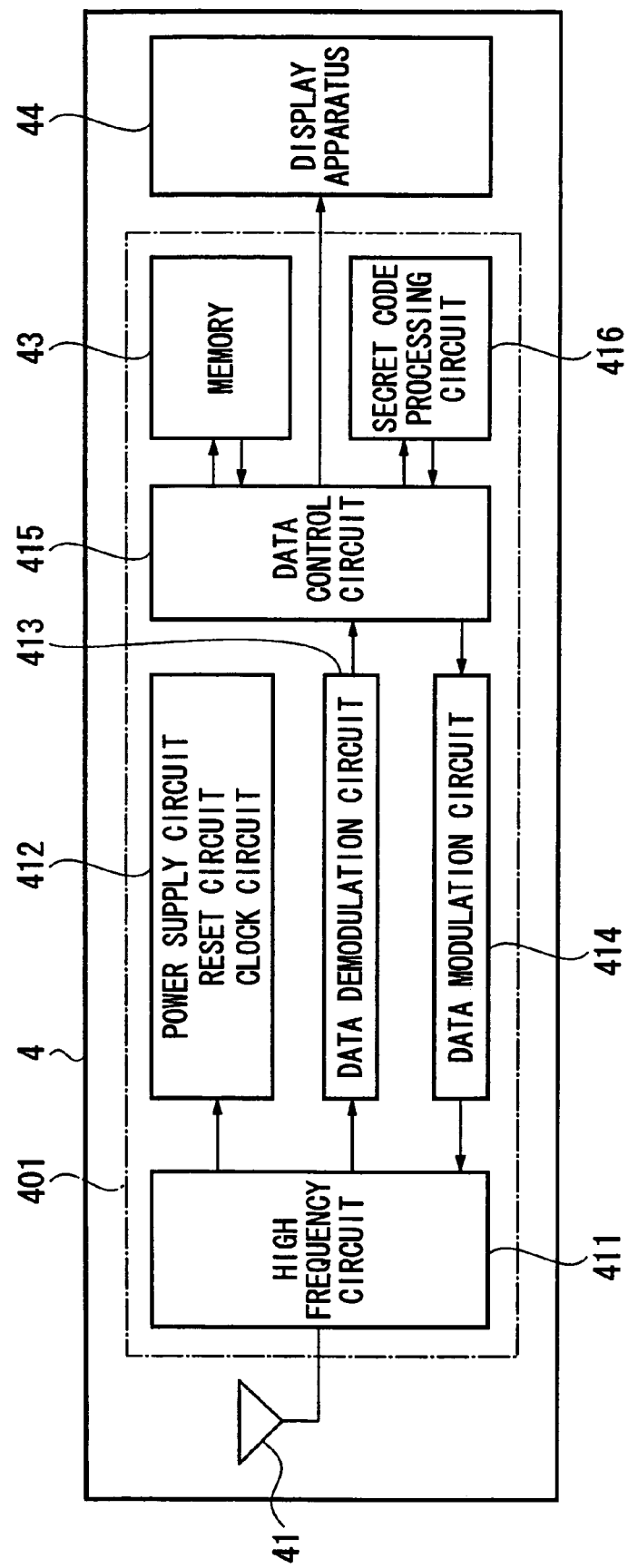
FIG. 3 is a block diagram showing a constitution of a merchandise tag according to FIG. 1.

IC 501 has the constitution corresponding to IC 401 in FIG. 3. IC 501 is composed of a high frequency circuit 511, a power supply portion 512, a data demodulation circuit 513, a data modulation circuit 514, a data control circuit 515, a memory 54, and a secret code processing circuit 516. The constitution thereof is the same constitution as the high frequency circuit 411, the power supply portion 412, the data demodulation circuit 413, the data modulation circuit 414, the data control circuit 415, the memory 43, and the secret code processing circuit 416 in FIG. 3, respectively. The data control circuit 515 controls each portion according to the program which is stored in the nonvolatile memory which is formed in the memory 54 or the data control circuit 515; however, the contents of the program thereof differs from that of the merchandise tag 4. Moreover, the power supply portion 512 is composed of the power supply circuit, the reset circuit, and the clock circuit as in the case of the power supply portion 412 in FIG. 3.

Figure 6:
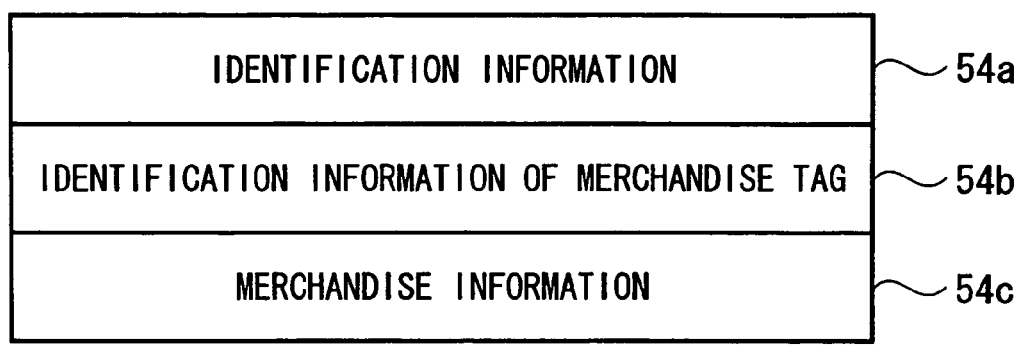
FIG. 6 is a figure showing a constitution of a memory according to FIG. 5.

Next, the constitution of the data which is stored in the memory 54 is explained with reference to FIG. 6. In the memory 54, the identification information 54a, the identification information 54b for the merchandise tag, and the merchandise information 54c are stored. The identification information 54a is particular information of each display apparatus 5 for merchandise rack, and is not usually changed after being written once. The identification information 54b of the merchandise tag is composed including the information which shows all identification information 43a of one or a plurality of merchandise tag 4 which is attached to the merchandise recorded on the merchandise information 54c. When the signal which instructs the writing of the data is transmitted, the identification information 54b of the merchandise tag confirms the identification information which indicates the display apparatus 5 for merchandise rack to which the data is written, and only when the identification information thereof conforms with the identification information 54a which is stored in the memory 54, is the writing of the data allowed.

The merchandise information 54c is composed of various data which constitutes the merchandise information. When the signal which instructs the writing of the data is transmitted, the identification information 54c confirms the identification information which indicates the display apparatus 5 for merchandise rack to which the data is written, and only when the identification information thereof conforms with the identification information 54a which is stored in the memory 54 is the writing of the data allowed.

Next, the contents of the merchandise information display processing according to the present system is explained with reference to FIG. 1, FIG. 2 and FIG. 7 to FIG. 10. First of all, the processing in the case of displaying the merchandise information on the merchandise tags 4a and 4b (or, in the case of updating the display of the merchandise information) is explained. However, in the merchandise information database 3, the identification information of the merchandise tags 4a and 4b which is attached to each piece of merchandise 9a and 9a is previously stored corresponding to the merchandise 9. When the merchandise information is displayed on the merchandise tags 4a and 4b the reader-writer 2 successively transmits the control signal which instructs the recording and the display of the merchandise information to each merchandise tag 4a and 4b which is attached to the merchandise 9a according to the instruction of the merchandise information management apparatus 1.

Figure 7:
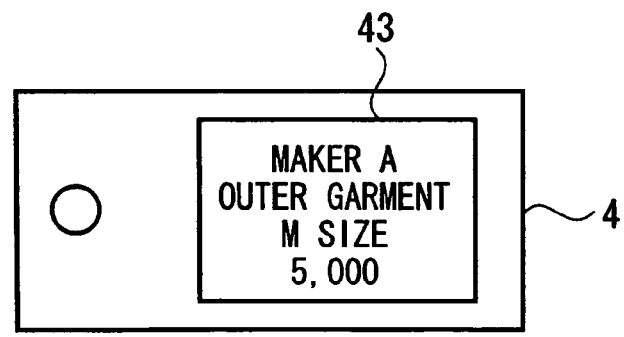
FIG. 7 is a plan view showing an example of a display of the merchandise tag according to FIG. 1.

Each merchandise tag 4a and 4b which received the control signal thereof confirms the identification information which is included in the control signal, and when the identification information thereof conforms with the identification information of the merchandise tag itself, the identification information thereof is stored as the merchandise information 43b in the memory 43. The transmitted merchandise information is the information such as a merchandise name, a merchandise number, a merchandise specification, a maker (producer) name, a manufactured (produced) day, a fixed price, the standard selling price, a present selling price (a price during a discount period), a amount of stock, an expiration date, a history of price change, a date of receipt of merchandise, and the like. Furthermore, in each merchandise tag 4a and 4b, a part of merchandise information which is selected according to the instruction which is included in the control signal transmitted from reader-writer 2 among the merchandise information which is stored in the memory 43 is displayed. An example of the display of the merchandise information is shown in FIG. 7. In the example shown in FIG. 7, the maker name ("maker A"), the merchandise name ("outer garment"), the size among the merchandise specification ("M size"), and the present selling price ("5000") displayed among various merchandise information are displayed.

Figure 8:
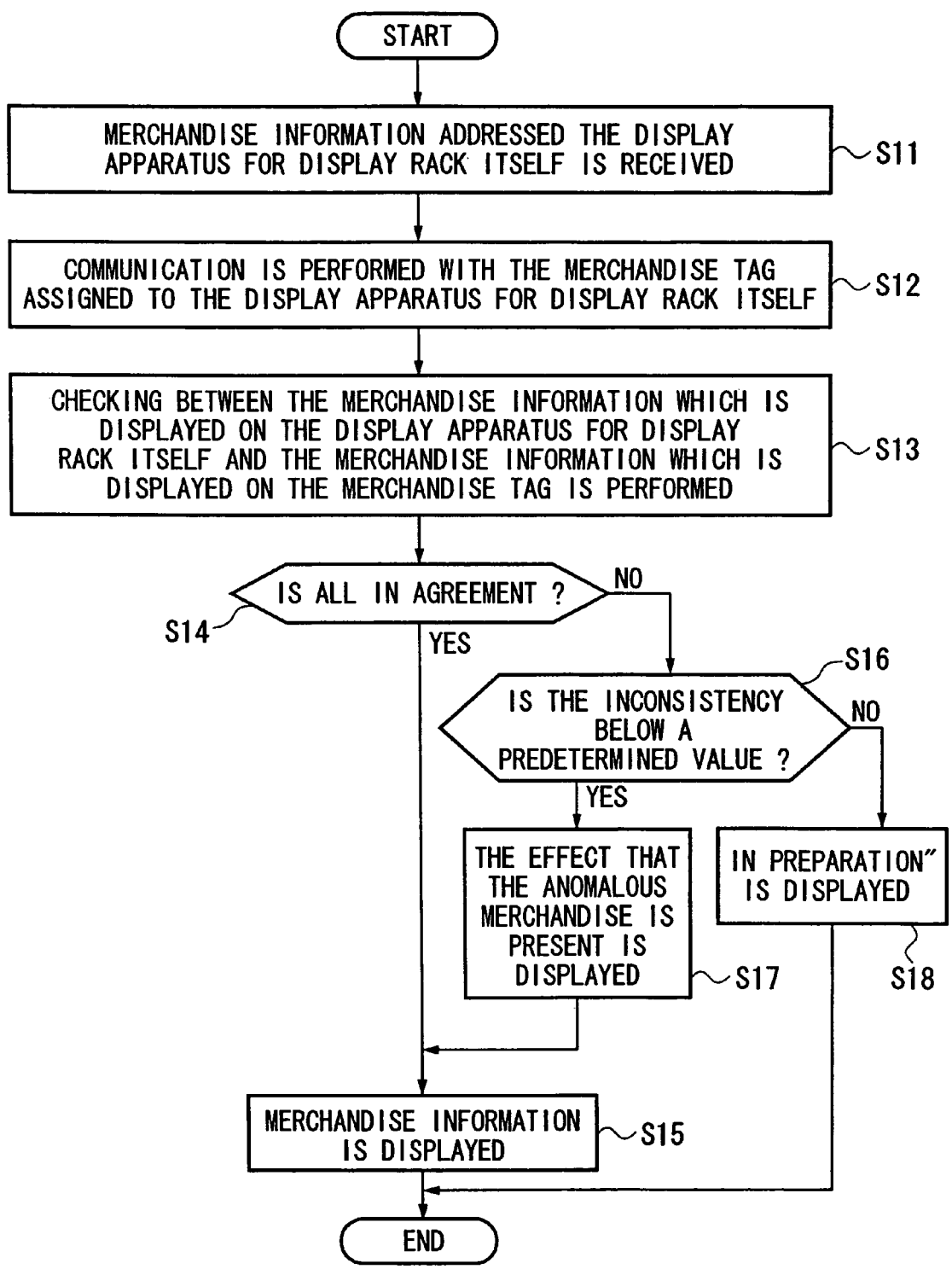
FIG. 8 is a flow chart which shows the contents of processing in the display apparatus for display rack according to FIG. 1.

Next, the processing in the case of displaying the merchandise information (or, in the case of updating the display of the merchandise information) on the display apparatus 5 for display rack is explained with reference to the flow chart in FIG. 8. First of all, each display apparatus 5 for display rack receives the control signal which is transmitted from the reader-writer 2, and confirms the identification information which is included in the control signal; furthermore, when the identification information thereof conforms with the identification information of the display apparatus 5 for the display rack, the identification information and the merchandise information of the merchandise tag which are included in the control signal thereof are extracted and stored in the memory 54 as the identification information 54*b* and the merchandise information 54*c* of the merchandise tag (Step S11).

Next, the display apparatus 5 for display rack communicates with the merchandise tag 4 which is assigned to the display apparatus 5 for the display rack (Step S12). The merchandise tag 4 which is assigned to the display apparatus 5 for the display rack is the merchandise tag 4 which is attached to the merchandise displayed at a position at which it is possible for the merchandise tag 4 to communicate with the display apparatus 5 for the display rack. For example, in Step S12, the communication is attempted using the antenna 52 of the display apparatus 5 for display rack, the merchandise tag 4 which can communicate, or the merchandise tag 4 which transmits a signal having an intensity which is greater than a predetermined level is detected, the merchandise tag 4 which is detected is determined to be the merchandise tag 4 which is assigned to the display apparatus 5 for the display rack, and the processing of receiving the identification information 43*a* or the merchandise information 43*b* is carried out.

The merchandise tag 4 which is assigned to the display apparatus 5 for the display rack in an example shown in FIG. 2 is the merchandise tag 4 which is attached to the merchandise which is displayed in display space of the display rack 8 which is decided as a display object by the display apparatus 5 for the display rack. For example, the merchandise tag which is assigned to the display apparatus 5*a* for display rack becomes the merchandise tags 4*a* and 4*b* which are attached to the merchandise 9*a* and 9*a* which is displayed in spaces 81 and 82. Moreover, the merchandise tag which is assigned to the display apparatus 5*b* for display rack becomes the merchandise tags 4*d* and 4*c* which are attached to the merchandise 9*b* and 9*b* which is displayed in spaces 83 and 84. However, for example, other merchandise (for example, the merchandise 9*b*) other than the merchandise 9*a* is mixed into space 81 or 82, the merchandise tag which is attached to the other merchandise (for example, the merchandise 9*b*) is communicated as the merchandise tag 4 which is assigned to the display apparatus 5 for the display rack.

Next, the processing of checking the merchandise information 54*c* which is displayed on the display apparatus 5 for the display rack and the merchandise information 43*b* which is recorded on each merchandise tag 4 which performed the communication in Step S12 is carried out (Step S13). The merchandise information 54*c* which is recorded in the memory 54, and is displayed on the display apparatus 5 for the display rack and the merchandise information 43*b* which is received from one or a plurality of merchandise tag 4 with which it was possible to communicate is compared with each other, and coincidence or disagreement of both merchandise information is checked. The information which is the object for checking among the merchandise information is that of the merchandise name, the merchandise number, and the present selling price and the like. For example, in the case in which the merchandise name and the merchandise number are in agreement each other, and the present selling price is not in agreement with each other, a decision as to which information is not in agreement (the check cannot be conducted) is made.

Next, as the result of checking in Step S13, it is determined whether all of checking with the merchandise information which is received from a plurality of merchandise tags 4 is in agreement or not (Step S14).

Figure 9:
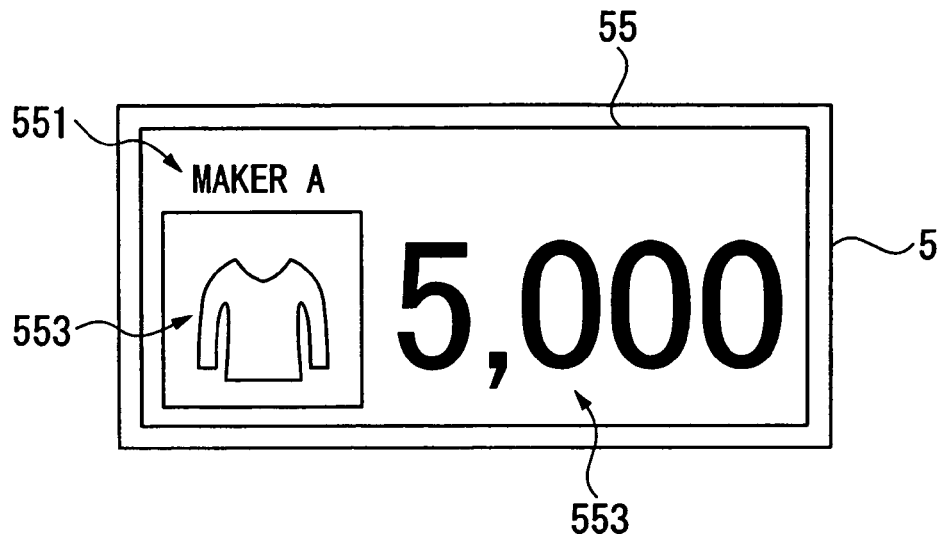
FIG. 9 is a figure showing an example of a display of the display apparatus for display rack according to FIG. 1.

In the case in which all of the checking is in agreement (in the case of "Yes" in Step S14), the merchandise information which is previously indicated among the merchandise information 54*c* which is recorded in the memory 54*c* is displayed on the display apparatus 55 (Step S15). An example of the display is shown in FIG. 9. In the example shown in FIG. 9, the information of the maker 551 ("MAKER A"), the image information 552 of the merchandise, and the present selling price 553 of the merchandise ("5000") are displayed on the display surface of the display apparatus 55.

On the other hand, in the case in which all of checking is not in agreement (in the case of "No" in Step S14), it is determined whether a rate or an absolute value of the merchandise tag 4 which was not in agreement is below a predetermined value or not (Step S16). In the case of being below the predetermined value (in the case of "Yes" in Step S16), after the effect that the anomalous merchandise tag 4 is present is displayed on the display apparatus 55 (Step S17), the merchandise information is displayed (Step S15). In Step S17, for example, regarding the example of the display shown in FIG. 9, the effect that the anomalous merchandise tag 4 is present is displayed by carrying out an on-and-off display of the image information 552 of the merchandise, or the like. However, in place of displaying the effect that the anomalous merchandise tag 4 is present on the display apparatus 55, or in addition that the effect that the anomalous merchandise tag 4 is present is displayed on the display apparatus 55, the effect thereof is displayed on the display apparatus which is not shown in the figures and is connected to the merchandise information management apparatus 1 in FIG. 1, and in addition that the display thereof is carried out, an notification by a sound signal may be carried out.

On the other hand, in the case in which the rate or the absolute value of the merchandise tag 4 which is not in agreement in Step S16 is larger than the predetermined value (in the case of "No" in Step S16), the display contents of the display apparatus 55 is set to the display to the effect of "IN PREPARATION" (Step S19). The display to the effect of "IN PREPARATION" is the display of the character or the sign which indicates the effect thereof, or is performed by means of not carrying out the display. However, the display to the effect of "IN PREPARATION" is carried out on the display apparatus 55, while the effect thereof is displayed on the display apparatus which is not shown in the figures and is connected to the merchandise information management apparatus 1 in FIG. 1, and in addition that the display thereof is carried out, notification by a sound signal may be carried out. By the above-mentioned processing, in the case in which the display contents of the merchandise information which is displayed on the merchandise tag 4 and the display contents of the merchandise information which is displayed on the corresponding display apparatus 5 for display rack are not in agreement, the display or the non-display which indicates the effect is performed, and thereby it can be prevented that the state of being inconsistent between the merchandise and the merchandise display remains, or the merchandise information was not updated. In addition, the display apparatus may be held on at least one of the merchandise tag 4 and the display apparatus 5 for display rack, and the merchandise information may be displayed on either of them.

Next, the processing in the case of displaying the merchandise information using the portable information terminal 6 is explained. When a customer pushes the button by closing the portable information terminal 6 to the merchandise tag 4 or the display apparatus 5 for display rack, the signal which demands the display of the merchandise information from the reader 6 to the merchandise tag 4 or the display apparatus 5 for display rack is transmitted. When the merchandise tag 4 or the display apparatus 5 for display rack receives the signal thereof, the merchandise tag 4 or the display apparatus 5 for display rack reads the demanded merchandise information from the memory 43 or 54, and transmits the merchandise information thereof to the reader 6.

Figure 10:
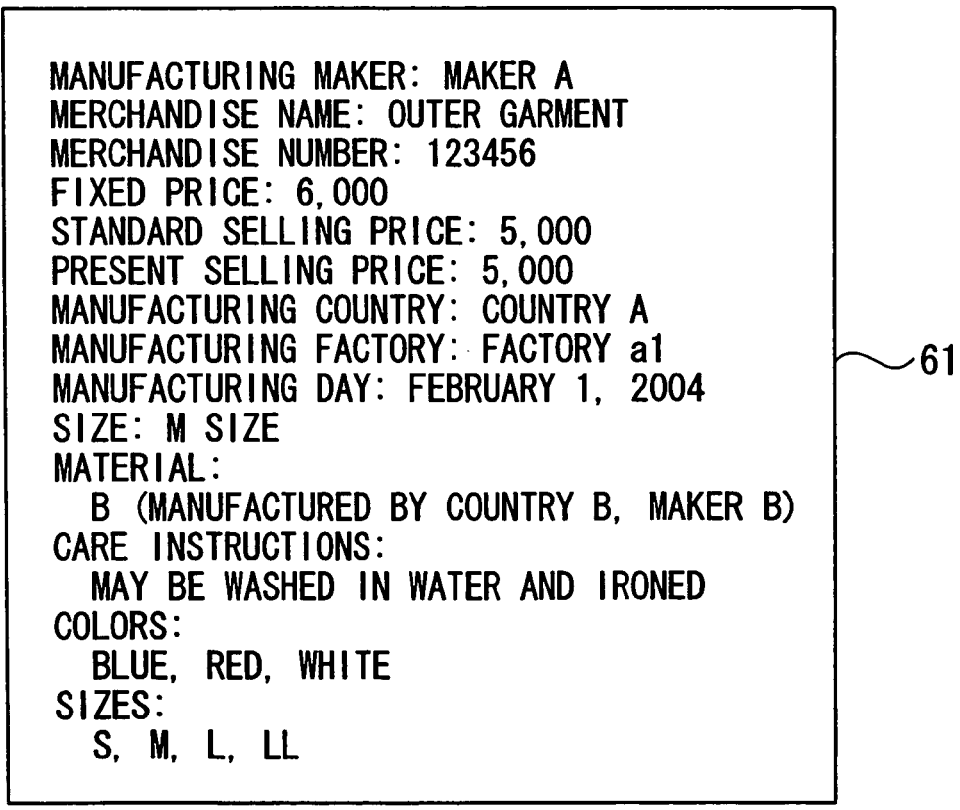
FIG. 10 is a figure showing an example of a display of a portable information terminal according to FIG. 1.

The portable information terminal 6 displays the received merchandise information on the display apparatus 61 as shown in, for example, FIG. 10. In an example of the display in FIG. 10, each piece of information such as the manufacturing maker ("MAKER A"), the merchandise name ("OUTER GARMENT"), the merchandise number ("123456"), the fixed price ("6,000"), the standard selling price ("5,000"), the present selling price ("5,000"), the manufacturing country ("COUNTRY A"), the manufacturing factory ("FACTORY a1"), the manufacturing day ("Feb. 1, 2004"), the size ("M SIZE"), the material ("B (MANUFACTURED BY COUNTRY B, MAKER B)"), care instructions ("MAY BE WASHED IN WATER AND IRONED"), the colors ("BLUE, RED, WHITE"), and the sizes ("S, M, L, LL") are displayed on the display apparatus 61.

In addition, the merchandise information is not limited to the above-mentioned examples, and besides information about the merchandise itself, information such as use and the like, and information of related products can be included in the merchandise information. For example, if the merchandise is food, the information of a recipe using the food thereof may be displayed.

Moreover, as the method of searching the merchandise tag 4 which is assigned to the display apparatus 5 for the display rack in the display apparatus 5 for display rack, directivity may be given to the antenna, a plurality of antennas may be arranged near the merchandise, and thereby the distance between the merchandise and the antenna is decreased, that is, the relative difference with other antennas become larger, the receiving intensity for the same merchandise tag 4 in the other display apparatus 5 for display rack is compared at both side, and the side of the higher intensity is assigned.

The computer system is provided inside of each apparatus described above. Furthermore, the above-mentioned processing is stored in the storing medium in which the reading in the form of the program by the computer is possible, the computer reads and performs the program thereof, and thereby the above-mentioned processing is carried out.

Here, the storing medium which can be read by the computer is a magnetic disk, a magneto-optical disc, CD-ROM, DVD-ROM, semiconductor memory, and the like. Moreover, the computer program thereof may be distributed to the computer by a communication line, and the computer which received the distribution program may execute the program thereof.

Moreover, the above-mentioned program may carry out a part of the above-mentioned function.

Furthermore, the above-mentioned function may be realized by combining with the program which has been already stored in the computer system, which is called a difference file (a difference program).

While preferred embodiments of the invention have been described and illustrated above, it should be understood that these are exemplary of the invention and are not to be considered as limiting. Additions, omissions and substitutions, and other modifications can be made without departing from the spirit or scope of the present invention. Accordingly the invention is not to be considered as being limited by the foregoing description, and is only limited by the scope of the appended claims.

What is claimed is:

1. A store management system comprising:
a management apparatus configured to transmit a first signal and a second signal;
a tag having a first display and a first antenna, the tag receiving the first signal transmitted from the management apparatus, the first display being configured to display information according to the first signal;
a display apparatus having a second display and a second antenna, the display apparatus receiving the second signal transmitted from the management apparatus, the second display being configured to display information according to the second signal, the display apparatus being configured to directly communicate with the tag using the first and second antennas; and
a display rack configured to store a plurality of merchandise each having the tag, the display apparatus being attached to the display rack, the display rack having a space assigned to the display apparatus, the tag having a first memory that stores first information about the merchandise, the display apparatus having a second memory that stores second information about predetermined merchandise which is addressed to the space,
wherein the display apparatus is configured to check whether the first information is in agreement with the second information regarding each tag of the merchandise addressed to the space,
in a case that a rate or an absolute value of the tags which are not in agreement is below a predetermined value, the display apparatus displays a first notification, and
in a case that a rate or an absolute value of the tags which are not in agreement is larger than the predetermined value, the display apparatus displays a second notification different from the first notification.

2. A store management system comprising:
a management apparatus configured to transmit a first signal and a second signal;
a plurality of tags receiving the plurality of first signals transmitted from the management apparatus, the plurality of tags being configured to store information according to the first signal;
a display apparatus having a display and receiving the second signal transmitted from the management apparatus, the display being configured to display second information according to the second signal, the display apparatus being configured to directly communicate with the plurality of tags; and
a display rack configured to store a plurality of merchandise each having the tag, the display apparatus being attached to the display rack, the display rack having a space assigned to the display apparatus, the tag having a first memory that stores first information about the merchandise, the display apparatus having a second memory that stores second information about predetermined merchandise which is addressed to the space,
wherein the display apparatus is configured to check whether the first information is in agreement with the second information regarding each tag of the merchandise addressed to the space,
in a case that a rate or an absolute value of the tags which are not in agreement is below a predetermined value, the display apparatus displays a first notification, and in a case that a rate or an absolute value of the tags which are not in agreement is larger than a predetermined value, the display apparatus displays a second notification different from the first notification.

3. A store management method comprising:

transmitting a first signal from a management apparatus to a tag having a first display, the first display being configured to display information according to the first signal;

transmitting a second signal from a management apparatus to a display apparatus having a second display, the second display being configured to display a information according to the second signal;

directly communicating between the display apparatus and the tag;

storing a plurality of merchandise each having the tag in a display rack, the display apparatus being attached to the display rack, the display rack having a space assigned to the display apparatus, the tag having a first memory that stores first information about the merchandise, the display apparatus having a second memory that stores second information about predetermined merchandise which is addressed to the space;

checking whether the first information is in agreement with the second information regarding each tag of the merchandises addressed to the space;

in a case that a rate or an absolute value of the tags which are not in agreement is below a predetermined value, carrying out a first notification; and in a case that a rate or an absolute value of the tags which are not in agreement is larger than the predetermined value, carrying out a second notification different from the first notification.

4. A store management method comprising:

transmitting a plurality of first signals from a management apparatus to a plurality of tags, the plurality of tags being configured to store a plurality of information corresponding to the plurality of first signals;

transmitting a second signal from the management apparatus to a display apparatus having a display, the display being configured to display second information according to the second signal;

directly communicating between the display apparatus and the plurality of tags;

storing a plurality of merchandise each having the tag in a display rack, the display apparatus being attached to the display rack, the display rack having a space assigned to the display apparatus, the tag having a first memory that stores first information about the merchandise, the display apparatus having a second memory that stores second information about predetermined merchandise which is addressed to the space;

checking whether the first information is in agreement with the second information regarding each tag of the merchandise addressed to the space;

in a case that a rate or an absolute value of the tags which are not in agreement is below a predetermined value, carrying out a first notification; and in a case that a rate or an absolute value of the tags which are not in agreement is larger than the predetermined value, carrying out a second notification different from the first notification.

5. The store management system according to claim 2, the display apparatus having a plurality of antennas, the display apparatus communicating with the plurality of tags via the plurality of antennas.

6. A store management system comprising:

a tag having a first antenna and a memory that stores a first information; a display apparatus having a display and a second antenna, the display being configured to display information, the display apparatus being configured to directly communicate with the tag using the first and second antennas in order to check; and a display rack configured to store a plurality of merchandise each having the tag, the display apparatus being attached to the display rack, the display rack having a space assigned to the display apparatus, the display apparatus having a second memory that stores second information about predetermined merchandise which is addressed to the space, wherein the display apparatus is configured to check whether the first information is in agreement with the second information regarding each tag of the merchandise addressed to the space, in a case that a rate or an absolute value of the tags which are not in agreement is below a predetermined value, the display apparatus displays a first notification, and in a case that a rate or an absolute value of the tags which are not in agreement is larger than the predetermined value, the display apparatus displays a second notification different from the first notification.

7. The store management system according to claim 6, further comprising:

a management apparatus configured to transmit a first signal and a second signal, the tag receiving the first signal and storing the first information corresponding to the first signal, the display apparatus receiving the second signal and displaying the information according to the second signal.

8. The store management system according to claim 1, wherein the first notification notes that an anomalous merchandise is present in the space of the display rack.

9. The store management system according to claim 8, wherein the second notification notes that the space of the display rack is in preparation.

10. The store management system according to claim 1, wherein the first information and the second information includes a merchandise name, a merchandise number, and a present selling price, and in a case that the merchandise name and the merchandise number are in agreement between the first and the second information, and that the present selling price is not in agreement between the first and second information, a decision as to which information is not in agreement is made.

* * * * *